United States Patent [19]

Nishikawa et al.

[11] Patent Number: 4,643,157
[45] Date of Patent: Feb. 17, 1987

[54] CYLINDER HEAD FOR INTERNAL COMBUSTION ENGINES

[75] Inventors: Masayasu Nishikawa, Tokyo; Kenji Kimura, Sayama, both of Japan

[73] Assignee: Honda Giken Kogyo Kabushiki Kaisha, Tokyo, Japan

[21] Appl. No.: 534,385

[22] Filed: Sep. 21, 1983

[30] Foreign Application Priority Data

Sep. 27, 1982 [JP] Japan .................. 57-146167[U]

[51] Int. Cl.⁴ ............................................ F02M 25/06
[52] U.S. Cl. .................................... 123/568; 123/570
[58] Field of Search ............................... 123/568, 570

[56] References Cited

U.S. PATENT DOCUMENTS

| | | | |
|---|---|---|---|
| 3,937,194 | 2/1976 | Tamaki et al. | 123/568 |
| 4,221,203 | 9/1980 | Hayashi et al. | 123/568 |
| 4,328,781 | 5/1982 | Morita | 123/568 |
| 4,413,605 | 11/1983 | Leoni | 123/568 |

FOREIGN PATENT DOCUMENTS 2740465 3/1979 Fed. Rep. of Germany ...... 123/568

Primary Examiner—Willis R. Wolfe, Jr.
Attorney, Agent, or Firm—Lyon & Lyon

[57] ABSTRACT

In an internal combustion engine of the crossflow type, a cylinder head is formed therein with an exhaust gas recirculating passage which opens at one end in the inner peripheral surface of the exhaust port, wherein the open end is directed at a predetermined sharp angle with respect to the same inner peripheral surface and in a direction reverse to the direction in which the flow of exhaust gases is introduced into the exhaust port. Further, at least part of the exhaust gas recirculating passage extends in the vicinity of at least one cooling water jacket formed within the cylinder head. Thereby, recirculation of an excessive amount of exhaust gases can be prevented and the temperature of exhaust gas recirculated can be lowered.

11 Claims, 4 Drawing Figures

CYLINDER HEAD FOR INTERNAL COMBUSTION ENGINES

BACKGROUND OF THE INVENTION

This invention relates to a cylinder head for internal combustion engines, and more particularly to improvements in the arrangement of an exhaust gas recirculating passage in the cylinder head.

Exhaust gas recirculation systems are well known which returns part of exhaust gases emitted from an internal combustion engine to the intake system of the engine so as to lower the maximum combustion temperature within the cylinders of the engine, to thereby reduce the amount of nitrogen oxides (NOx) contained in the exhaust gases. In an internal combustion engine of the so-called crossflow type wherein the intake system and the exhaust system are arranged at diametrically opposite sides of each cylinder head, the cylinder head is formed therein with a cavity defining a combustion chamber in cooperation with a cylinder and a piston, an intake port located at one side of an axial plane extending through the diametrical center of the same cavity and axially of the crankshaft of the engine and communicating with the combustion chamber-defining cavity, an exhaust port located at the opposite side of the above axial plane and communicating with the combustion chamber-defining cavity, and an exhaust gas recirculating passage forming part of an exhaust gas recirculation system and communicating with the exhaust port. Part of exhaust gases emitted into the exhaust port is guided through the exhaust gas recirculating passage to a portion of the cylinder head at which an intake manifold is mounted, and further guided through a passage formed within the intake manifold to an exhaust gas recirculation control valve mounted in the intake manifold. The exhaust gas recirculation control valve operates in response to operating conditions of the engine to supply a suitable amount of exhaust gases through a passage extending in the manifold along a lateral wall thereof to an intake passage formed within the intake manifold, where the exhaust gases are mixed into the mixture. In this way, exhaust gas recirculation is carried out.

If exhaust gases are returned at an excessive rate and mixed into the mixture, there can undesirably occur a drop in the output of the engine, as well as unstable combustion of the mixture in the engine cylinders. However, in the aforementioned conventional cylinder head, an excessive amount of exhaust gases can frequently flow into the exhaust gas recirculating passage via a gasinlet end of the same passage which opens in the exhaust port, due to incessantly fluctuating flows of exhaust gases in the exhaust port, causing the above-mentioned inconvenience.

Furthermore, component parts of the exhaust gas recirculation system such as the exhaust gas recirculation control valve are exposed to the hot exhaust gases flowing in the exhaust gas recirculating passage, which can result in shortened effective life of the exhaust gas recirculation system.

SUMMARY OF THE INVENTION

It is an object of the invention to provide a cylinder head for an internal combustion engine, which has an exhaust gas recirculating passage formed therein and arranged so as to prevent an excessive amount of exhaust gases from flowing into the passage, to thereby prevent a drop in the output of the engine, as well as achieve stable combustion within the engine cylinder.

It is a further object of the invention to provide a cylinder head for an internal combustion engine, which has an exhaust gas recirculating passage formed therein as part of an exhaust gas recirculation system and arranged so as to lower the temperature of exhaust gases flowing in the passage, to thereby prolong the effective lives of component parts of the exhaust gas recirculation system.

The present invention provides a cylinder head for use in an internal combustion engine, which has an interior thereof formed with a cavity for defining a combustion chamber in cooperation with a cylinder and a piston of the engine, an intake port located at one side of the cylinder head and communicating with the combustion chamber-defining cavity, an exhaust port located at the opposite side of the cylinder head and communicating with the combustion chamber-defining cavity, and at least one exhaust gas recirculating passage communicating with the exhaust port. The exhaust gas recirculating passage has one end opening in the exhaust port, wherein the above one end of the exhaust gas recirculating passage is directed at a predetermined sharp angle with respect to the inner peripheral surface of the exhaust port, preferably extending substantially tangentially of the same inner peripheral surface, and directed in a direction reverse to the direction in which exhaust gases are emitted into the exhaust port from the combustion chamber.

Further, the cylinder head has its interior formed with coolant passage means for cooling the combustion chamber, the intake port and the exhaust port. At least part of the exhaust gas recirculating passage extends in the vicinity of the above coolant passage means at a side of the combustion chamber-defining cavity remote from the engine cylinder.

The above and other objects, features and advantages of the invention will be more apparent from the ensuing detailed description taken in conjunction with the accompanying drawings.

BRIEF DESCRIPTION OF THE INVENTION

DETAILED DESCRIPTION

The invention will now be described in detail with reference to the drawings.

Figure 1:
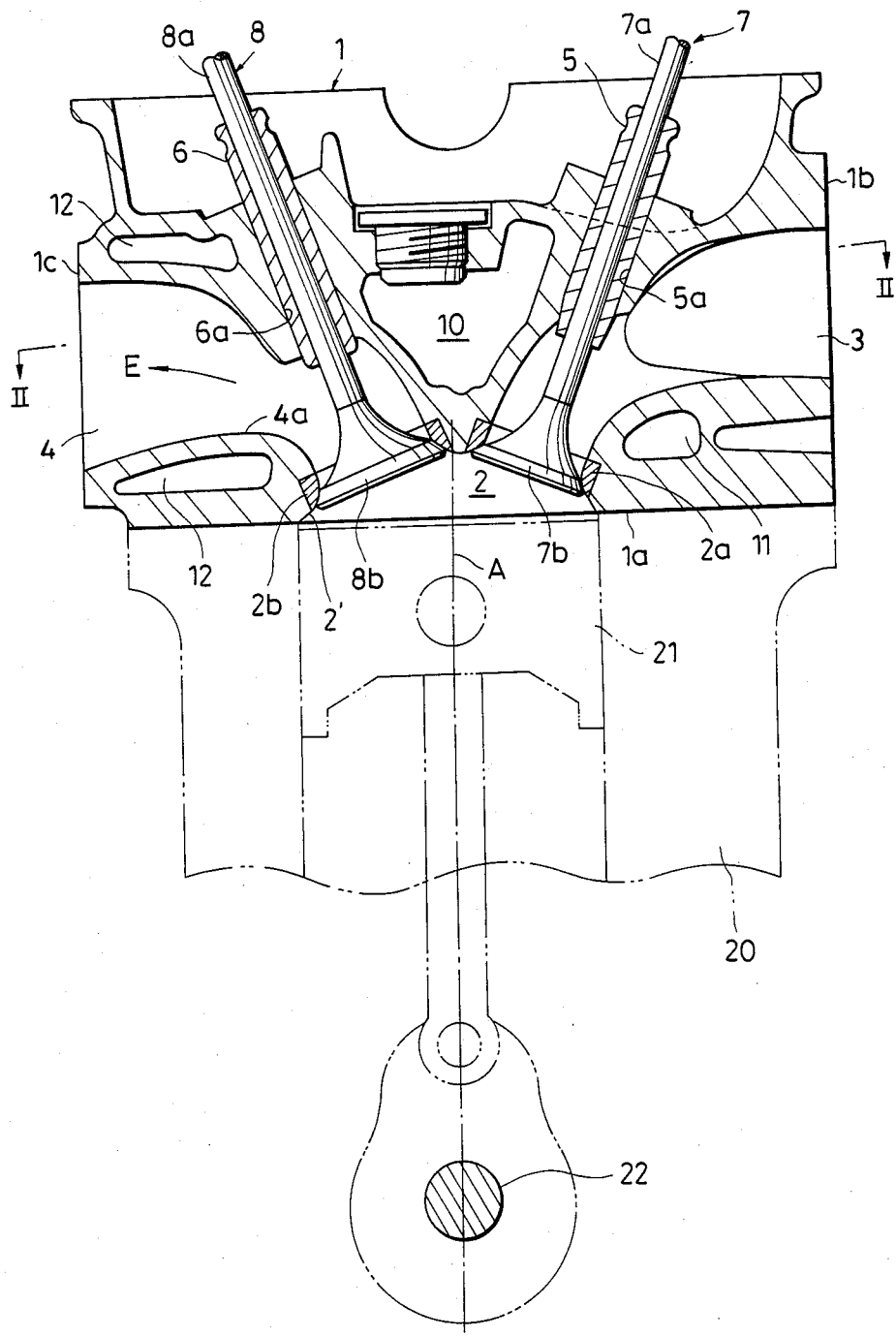
FIG. 1 is a longitudinal sectional view of a cylinder head for an internal combustion engine according to one embodiment of the invention.

Referring first to FIG. 1, there is illustrated an embodiment of the invention which is applied to a cylinder head for use in an internal combustion engine of the so-called crossflow type in which the intake system of the engine and the exhaust system of same are arranged at diametrically opposite sides of the cylinder head. The cylinder head 1 has a bottom face 1a joined to one end face of a cylinder 20 of the engine and formed at its substantially central location with a cavity 2' for defining a combustion chamber 2 in cooperation with a piston 21 slidably received within the cylinder 20. The cylinder head 1 is further formed therein with an intake port 3 opening at one end in the above cavity 2' and at the other end in a lateral wall surface 1b of the cylinder head 1, respectively, and an exhaust port 4 opening at one end in the cavity 2' and at the other end in the opposite lateral wall surface 1c of the cylinder head 1, respectively. The exhaust port 4 is longitudinally curved at a portion in the vicinity of its one end opening in the cavity 2'.

The intake port 3 and the exhaust port 4 are located at opposite sides of an axial plane A extending through the diametrical center of the cavity 2' and axially of the crankshaft 22 of the engine.

Valve guides 5 and 6 are slidably fitted through respective guide holes 5a and 6a formed in the cylinder head 1 and opening, respectively, in the intake port 3 and the exhaust port 4. The valve guides 5, 6 have their respective one ends directed toward respective valve seats 2a and 2b formed at junctions of the ports 3, 4 with the cavity 2', to guide the respective rods 7a and 8a of an intake valve 7 and an exhaust valve 8 which are slidably fitted through the valve guides 5, 6. The intake valve and exhaust valve 7, 8 have respective valve bodies 7b and 8b urged against the respective valve seats 2a, 2b by the force of respective springs, not shown, thereby closing the intake port 3 and the exhaust port 4, respectively.

The cylinder head 1 is further formed therein with three water jackets 10, 11 and 12 which are disposed, respectively, just above the cavity 2' at a side remote from the cylinder 20, just below the intake port 3, and around the exhaust port 4. These water jackets 10-12 are connected to the cooling system, not shown, of the engine.

Figure 2:
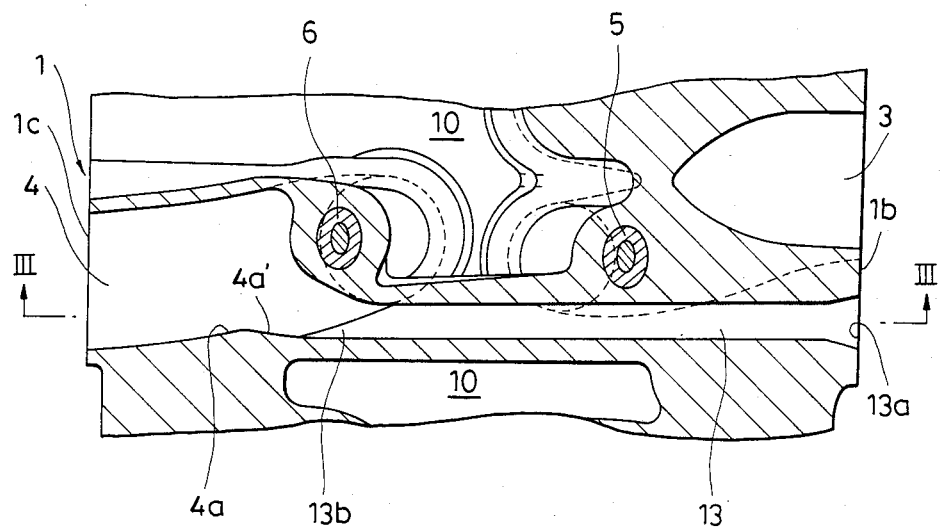
FIG. 2 is a sectional view taken along line II—II in FIG. 1.
Figure 3:
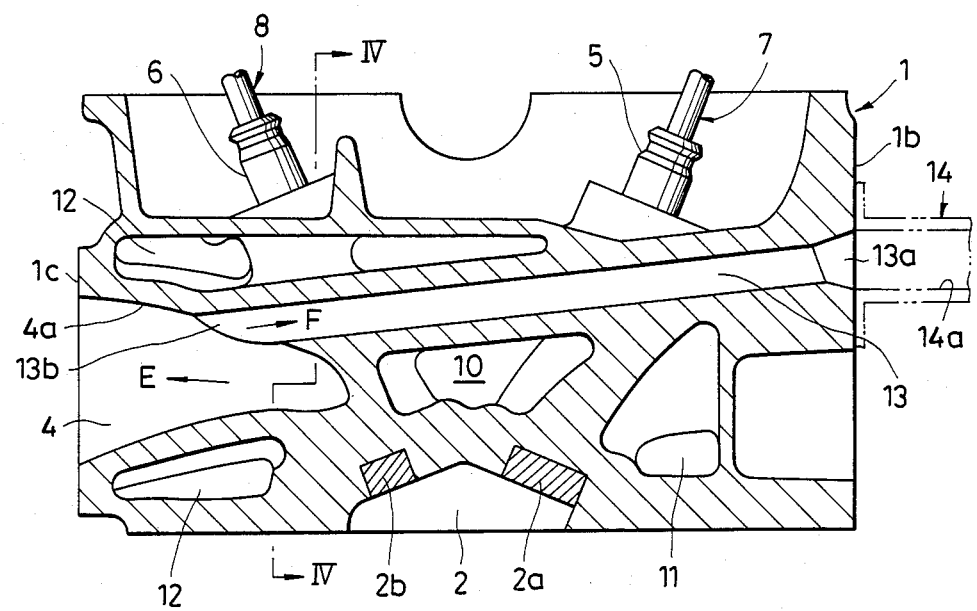
FIG. 3 is a sectional view taken along line III—III in FIG. 2.
Figure 4:
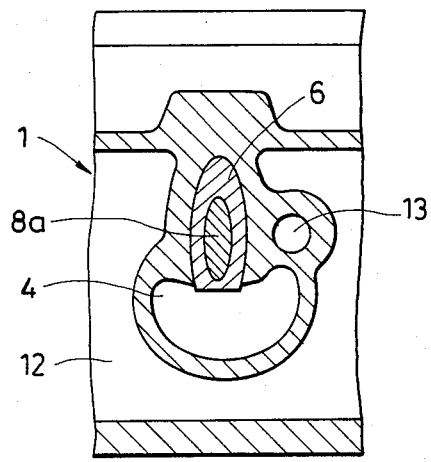
FIG. 4 is a sectional view taken along line IV—IV in FIG. 3.

As shown in FIGS. 2-4, an exhaust gas recirculating passage 13 is formed in the cylinder head 1 and extends from the exhaust port 4 to the lateral wall surface 1b of the cylinder head 1 at a zone above the cavity 2' or at a side of the cavity 2' remote from the cylinder 20. The exhaust gas recirculating passage 13 opens at one end 13a in the lateral wall surface 1b in which, opens the intake port 3, and opens at the other end 13b in the exhaust port 4 at its longitudinally curved inner peripheral surface portion 4a, exactly, at a lateral portion 4a' of the same surface portion 4a and at a side of the exhaust port 4 remote from the cavity 2'. The other end 13b of the exhaust gas recirculating passage 13 extends substantially along a line tangent to the curved inner peripheral surface 4a of the exhaust port 4. Further, as seen in FIG. 3, the same end 13b of the passage 13 extends in a direction indicated by the arrow F which is reverse to the direction (indicated by the arrow E) in which exhaust gases are emitted into the exhaust port 4 from the combustion chamber 2. The angle at which the open end 13b of the passage 13 extends with respect to the curved inner peripheral surface 4a is set at a sharp angle value, i.e. a value less than 90 degrees. As shown in FIGS. 3 and 4, a portion of the exhaust gas recirculating passage 13 between the open end 13b or the junction with the exhaust port 4 and a nearly middle point of the passage 13 extends through the water jacket 10 which extends at a zone just above the cavity 2' or at a side of the cavity 2' remote from the cylinder 20, in a manner surrounded by the water jacket, and also extends in the vicinity of the water jacket 12 which is disposed around the exhaust port 4. The other end 13a of the passage 13 is adapted for connection with a passage 14a formed in an intake manifold 14 to be mounted onto the lateral wall surface 1b of the cylinder head 1, as indicated by the two-dot chain lines in FIG. 3 so that it can communicate with an exhaust gas recirculation control valve, not shown, arranged in the intake manifold 14. Although only one exhaust gas recirculating passage 13 is formed in the cylinder head 1 in the illustrated embodiment, two or more such passages may be formed in the cylinder head 1.

With the above arrangement, a mixture drawn into the combustion chamber 2 from the intake port 3 is burned within the combustion chamber 2 and is discharged therefrom into the exhaust port 4 in the form of exhaust gases. The exhaust gases flow in the exhaust port 4 in a direction indicated by the arrow E in FIG. 3 and delivered to the exhaust system, not shown, of the engine to be discharged into the atmosphere. On the other hand, part of the exhaust gases flowing in the exhaust port 4 are drawn into the exhaust gas recirculating passage 13 through the open end 13b, and therefrom they travel in the passage 14a in the intake manifold 14 and the exhaust gas recirculation control valve in the same manifold 14, and then is further guided along another exhaust gas recirculating passage, not shown, formed in the intake manifold 14, to be returned to the intake system of the engine and delivered to the intake port 3 together with a mixture.

As shown in FIG. 3, the direction of a flow of exhaust gases flowing into the exhaust gas recirculating passage 13 is reverse to the direction of the mainstream of exhaust gases flowing in the exhaust port 4 toward the exhaust system, not shown, of the engine, as indicated by the arrows E, F in FIG. 3. Therefore, almost little of exhaust gases can be forcedly introduced into the exhaust gas recirculating passage 13 by the pressure of the mainstream of exhaust gases, to thereby prevent an excessive amount of exhaust gases from being returned to the intake system of the engine through the passage 13. This can avoid a drop in the engine output and ensures stable combustion within the engine cyliner even during exhaust gas recirculation.

Furthermore, the exhaust gas recirculating passage 13 extends in the vicinity of the water jackets 10, 12 along a substantially half length thereof so that exhaust gases are cooled by the cooling water in the water jackets as they travel in the exhaust gas recirculating passage 13 to have their temperature reduced, to thereby minimize the influence of the hot exhaust gases upon component parts of the exhaust gas recirculation control system such as the exhaust gas recirculation control valve and accordingly prolong their lives.

While a preferred embodiment of the invention has been described, variations thereto will occur to those skilled in the art within the scope of the present inventive concepts which are delineated by the following claims.

What is claimed is:

1. In a cylinder head for an internal combustion engine including at least one cylinder, and at least one piston, said cylinder head having an interior thereof formed with a cavity for defining a combustion chamber in cooperation with said piston of said engine associated with said cylinder head, an intake port located at one side of said cylinder head and communicating with said cavity, an exhaust port located at another opposite side of said cylinder head and communicating with said cavity, said exhaust port having an inner peripheral surface, at least one exhaust gas recirculating passage communicating with said exhaust port, and a guide hole opening at one end in said exhaust port for a valve guide to be slidably fitted therethrough, the improvement wherein said exhaust gas recirculating passage has one end opening in said exhaust port, said inner peripheral surface of said exhaust port having a portion curved longitudinally of said exhaust port, said curved portion of said inner peripheral surface of said exhaust port having a lateral portion, said one end of said exhaust gas recirculating passage opening in said inner peripheral surface of said exhaust port at a location downstream of said one end of said guide hole and directed at a predetermined sharp angle with respect to said inner peripheral surface of said exhaust port in a direction reverse to the direction in which exhaust gases are emitted into said exhaust port from said combustion chamber and said one end of said exhaust gas recirculating passage opening in said lateral portion of said curved portion of said inner peripheral surface portion of said exhaust port at a side of said exhaust port remote from said cavity, and said one end of said exhaust gas recirculating passage is directed substantially tangential to said opening in said lateral portion of said exhaust port.

2. A cylinder head for an internal combustion engine of the cross-flow type including at least one cylinder, at least one piston and a crankshaft, said cylinder head having an interior thereof formed with a cavity for defining a combustion chamber in cooperation with said cylinder and said piston of said engine associated with said cylinder, said cavity having a diametrical center thereof, an intake port located at one side of an axial plane extending through said diametrical center of said cavity and axially of of said crankshaft and communicating at one end with said cavity, an exhaust port located at another opposite side of said axial plane and communicating at one end with said cavity, said exhaust port having an inner peripheral surface, at least one exhaust gas recirculating passage having one end communicating with said exhaust port, a guide hole opening at one end in said exhaust port for a valve guide to be slidably fitted therethrough, said cylinder head having a first lateral side surface located at one side of said axial plane, said intake port opening at another end in said first lateral side surface of said cylinder head, and a second lateral side surface located at said other side of said axial plane, said exhaust port opening at another end in said second lateral side surface of said cylinder head, said exhaust gas recirculating passage having another end opening in said first lateral side surface of said cylinder head, said inner peripheral surface of said exhaust port having a portion curved longitudinally of said exhaust port, said curved portion of said inner peripheral surface of said exhaust port having a lateral portion, said one end of said exhaust gas recirculating passage opening in said inner peripheral surface of said exhaust port at a location down stream of said one end of said guide hole and directed at a predetermined sharp angle with respect to said inner peripheral surface of said exhaust port in a direction reverse to the direction in which the exhaust gases are emitted into said exhaust port from said combustion chamber, said one end of said exhaust gas recirculating passage opening in said lateral portion and at an upper portion of said curved portion of said inner peripheral surface portion of said exhaust port and at a side of said exhaust port remote from said cavity, said exhaust gas recirculating passage extending generally linearly through the cylinder head.

3. A cylinder head for an internal combustion engine of the cross-flow type including at least one cylinder, at least one piston and a crankshaft, said cylinder head having an interior therof formed with a cavity for defining a combustion chamber in cooperation with said cylinder and said piston of said engine associated with said cylinder, said cavity having a diametrical center thereof, an intake port located at one side of an axial plane extending through said diametrical center of said cavity and axially of said crankshaft and communicating at one end with said cavity, an exhaust port located at another opposite side of said axial plane and communicating at one end with said cavity, said exhaust port having an inner peripheral surface, at least one exhaust gas recirculating passage having one end communicating with said exhaust port, a guide hole opening at one end in said exhaust port for a valve guide to be slidably fitted therethrough, and coolant passage means for cooling said combustion chamber and said exhaust port, at least part of said exhaust gas recirculating passage extending in said coolant passage means, said inner peripheral surface of said exhaust port having a portion curved longitudinally of said exhaust port, said curved portion of said inner peripheral surface of said exhaust port having a lateral portion, said one end of said exhaust gas recirculating passage opening in said inner peripheral surface of said exhaust port at a location down stream of said one end of said guide hole and directed at a predetermined sharp angle with respect to said inner peripheral surface of said exhaust port in a direction reverse to the direction in which the exhaust gases are emitted into said exhaust port from said combustion chamber, said one end of said exhaust gas recirculating passage opening in said lateral portion and at an upper portion of said curved portion of said inner peripheral surface portion of said exhaust port and at a side of said exhaust port remote from said cavity, said exhaust gas recirculating passage extending generally linearly through the cylinder head.

4. A cylinder head for an internal combustion engine of the cross-flow type including at least one cylinder, at least one piston and a crankshaft, said cylinder head having an interior thereof formed with a cavity for defining a combustion chamber in cooperation with said cylinder and said piston of said engine associated with said cylinder, said cavity having a diametrical center thereof, an intake port located at one side of an axial plane extending through said diametrical center of said cavity and axially of said crankshaft and communicating at one end with said cavity, an exhaust port located at another opposite side of said axial plane and communicating at one end with said cavity, said exhaust port having an inner peripheral surface, at least one exhaust gas recirculating passage having one end communicating with said exhaust port, a guide hole opening at one end in said exhaust port for a valve guide to be slidably fitted therethrough, said inner peripheral surface of said exhaust port having a portion curved longitudinally of said exhaust port, said curved portion of said inner peripheral surface of said exhaust port having a lateral portion, said one end of said exhaust gas recirculating passage opening in said inner peripheral surface of said exhaust port at a location downstream of said one end of said guide hole and directed at a predetermined sharp angle with respect to said inner peripheral surface of said exhaust port in a direction reverse to the direction in which the exhaust gases are emitted into said exhaust port from said combustion chamber, said one end of said exhaust gas recirculating passage opening in said lateral portion and at an upper portion of said curved portion of said inner peripheral surface portion of said exhaust port and at a side of said exhaust port remote from said cavity, said exhaust gas recirculating passage extending generally linearly through the cylinder head.

5. In a cylinder head for an internal combustion engine of the cross-flow type including at least one cylinder, at least one piston and a crankshaft, said cylinder head having an interior thereof formed with a cavity for defining a combustion chamber in cooperation with said cylinder and said piston of said engine associated with said cylinder, said cavity having a diameterical center thereof, an intake port located at one side of an axial plane extending through said diameterical center of said cavity and axially of said crankshaft and communicating at one end with said cavity, an exhaust port located at another opposite side of said axial plane and communicating at one end with said cavity, said exhaust port having an inner peripheral surface, at least one exhaust gas recirculating passage having one end communicating with said exhaust port, a guide hole opening at one end in said exhaust port for a valve guide to be slidably fitted therethrough, and coolant passage means for cooling said combustion chamber and said exhaust port, at least part of said exhaust gas recirculating passage extending in said coolant passage means, said cylinder head having a first lateral side surface located at one side of said axial plane, said intake port opening at another end in said first lateral side surface of said cylinder head, and a second lateral side surface located at said other side of said axial plane, said exhaust port opening at another end in said second lateral side surface of said cylinder head, the improvement comprising said exhaust gas recirculating passage having another end opening in said first lateral side surface of said cylinder head, said inner peripheral surface of said exhaust port having a portion curved longitudinally of said exhaust port, said curved portion of said inner peripheral surface of said exhaust port having a lateral portion, said one end of said exhaust gas recirculating passage opening in said inner peripheral surface of said exhaust port at a location down stream of said one end of said guide hole and directed at a predetermined sharp angle with respect to said inner peripheral surface of said exhaust port in a direction reverse to the direction in which the exhaust gases are emitted into said exhaust port from said combustion chamber, said one end of said exhaust gas recirculating passage opening in said lateral portion and at an upper portion of said curved portion of said inner peripheral surface portion of said exhaust port and at a side of said exhaust port remote from said cavity, said exhaust gas recirculating passage extending generally linearly through the cylinder head.

6. A cylinder head as set forth in claim 5 wherein said one end of said exhaust gas recirculating passage is directed substantially tangential to said opening in said first lateral side surface of said cylinder head.

7. A cylinder head as set forth in claim 5 wherein said coolant passage means includes a first water jacket located close to said cavity at a side remote from said cylinder of said engine for cooling said combustion chamber, and a second water jacket located around said exhaust port for cooling said exhaust port, said exhaust gas recircualting passage having a portion extending from said one end thereof to a side of said cavity remote from said cylinder of said engine, a portion of said exhaust gas recirculating passage extending through said first and second water jackets in a manner such that said exhaust gas recirculating passage is cicumferentially wholly surrounded by said first and said second water jackets.

8. In a cylinder head for an internal combustion engine of the cross-flow type including at least one cylinder, at least one piston, and a crankshaft, said cylinder head having an interior thereof formed with a cavity for defining a combustion chamber in cooperation with said cylinder and said piston of said engine associated with said cylinder head, said cavity having a diametrical center thereof, an intake port located at one side of an axial plane extending through said diametrical center of said cavity and axially of said crankshaft and communicating at one end with said cavity, an exhaust port located at another opposite side of said axial plane and communicating at one end with said cavity, said exhaust port having an inner peripheral surface, at least one exhaust gas recirculating passage having one end communicating with said exhaust port, a guide hole opening at one end in said exhaust port for a valve guide to be slidably fitted therethrough, the improvement wherein said exhaust gas recirculating passage has one end opening in said exhaust port, said inner peripheral surface of said exhaust port having a portion curved longitudinally of said exhaust port, said curved portion of said inner peripheral surface of said exhaust port having a lateral portion, said one end of said exhaust gas recirculating passage opening in said inner peripheral surface of said exhaust port at a location downstream of said one end of said guide hole, and directed at a predetermined sharp angle with respect to said inner peripheral surface of said exhaust port and in a direction reverse to a direction in which exhaust gases are emitted into said exhaust port from said combustion chamber, and said one end of said exhaust gas recirculating passage opening in said lateral portion of said curved portion of said inner peripheral surface portion of said exhaust port and at a side of said exhaust port remote from said cavity.

9. A cylinder head as claimed in claim 8, wherein said one end of said exhaust gas recirculating passage opens in said curved portion of said inner peripheral surface portion of said exhaust port at an upper portion thereof.

10. A cylinder head as claimed in claim 8, having said interior thereof formed with coolant passage means for cooling said combustion chamber and said exhaust port, and wherein at least part of said exhaust gas recirculating passage extends in coolant passage means.

11. A cylinder head as claimed in claim 10, wherein said coolant passage means includes a first water jacket located close to said cavity at a side remote from said cylinder of said engine for cooling said combustion chamber, and a second water jacket located around said exhaust port for cooling said exhaust port, said exhaust gas recirculating passage having a portion extending from said one end thereof to a point thereof at said side of said cavity remote from said cylinder of said engine, said portion of said exhaust gas recirculating passage extending in the vicinity of said first and second water jackets.

* * * * *